United States Patent
Chandrashekhara et al.

(10) Patent No.: US 12,524,179 B2
(45) Date of Patent: Jan. 13, 2026

(54) SYSTEMS AND METHODS FOR STATISTICAL-BASED IO WRITE PENDING AGING

(71) Applicant: Dell Products L.P., Round Rock, TX (US)

(72) Inventors: Sandeep Chandrashekhara, Shrewsbury, MA (US); Ramesh Doddaiah, Westborough, MA (US); Mohammed Aamir VT, Bangalore (IN); Mohammed Asher, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/630,173

(22) Filed: Apr. 9, 2024

(65) Prior Publication Data

US 2025/0315187 A1    Oct. 9, 2025

(51) Int. Cl.
*G06F 3/06* (2006.01)

(52) U.S. Cl.
CPC .......... *G06F 3/0656* (2013.01); *G06F 3/0616* (2013.01); *G06F 3/0625* (2013.01); *G06F 3/0679* (2013.01)

(58) Field of Classification Search
CPC .... G06F 3/0656; G06F 3/0616; G06F 3/0625; G06F 3/0679
See application file for complete search history.

(56) References Cited

U.S. PATENT DOCUMENTS

| | | | |
|---|---|---|---|
| 2018/0188970 A1* | 7/2018 | Liu | G06F 3/0653 |
| 2018/0260136 A1* | 9/2018 | Huo | G06F 3/0659 |
| 2019/0056870 A1* | 2/2019 | Sun | G06F 3/0611 |
| 2020/0089614 A1* | 3/2020 | Peng | G06F 12/0891 |
| 2021/0365379 A1* | 11/2021 | Creed | G06F 9/505 |
| 2022/0066691 A1* | 3/2022 | Zhang | G06F 3/0604 |
| 2022/0107893 A1* | 4/2022 | Benisty | G06F 12/0868 |
| 2024/0201869 A1* | 6/2024 | Colgrove | G06F 3/0689 |

* cited by examiner

*Primary Examiner* — Edward J Dudek, Jr.
(74) *Attorney, Agent, or Firm* — DALY, CROWLEY, MOFFORD & DURKEE, LLP

(57) ABSTRACT

Methods and apparatuses for improving storage array performance by using time-series characteristics on both a local storage area (extent-level, or track-level) basis as well as global, system level are disclosed. The time series characteristics are input to an aging model where optimal aging times, on a per-extent basis, are forecasted according to the local and global characteristics. The aging model may be a multivariate time-series model. Incoming write requests may be destaged from cache memory according to the forecasted optimal aging times for the storage extents.

17 Claims, 7 Drawing Sheets

SYSTEMS AND METHODS FOR STATISTICAL-BASED IO WRITE PENDING AGING

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a fabric network.

Storage arrays may often experience high traffic including incoming and outgoing Input/Output (I/O) requests. Dynamic Random-Access Memory (DRAM) is often used as a cache memory to temporarily store such requests until the request can be later processed to destage the request to long-term memory. Often the storage areas in the cache are repeatedly written to in back-to-back operations, degrading the cache memory and occupying system resources already under a significant strain.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to one aspect, a method for storing data may include receiving a write request from a host and storing the write request in a storage extent. At least one local Input/Output (I/O) characteristic from the storage extent may be captured and at least one global I/O characteristic may be retrieved from a memory. The at least one local I/O characteristic and the at least one global I/O characteristic may be input to an aging model. The aging model may generate a forecasted write-pending aging time for the storage extent based on the at least one local I/O characteristic and the at least one global I/O characteristic.

The method may include, alone or in combination, one or more of the following features. The write request may be written from the storage extent to a nonvolatile memory storage at an expiration of the forecasted aging time. The aging model may include a multivariate time-series model. The at least one local I/O characteristic may include an I/O size. The at least one local I/O characteristic may include a write-on-write statistic. The at least one global I/O characteristic may include a system write-pending level. The at least one global I/O characteristic may include a destage rate. The at least one global I/O characteristic may include a cache size. The at least one global I/O characteristic may include an I/O per second rate. The write request may include a compressed write request. The write request may include an uncompressed write request. The forecasted aging time may include a window and the write request may be written from the storage extent to a nonvolatile memory storage during the window. The write request may be stored in a write-pending data structure. The write-pending data structure may include a B-tree.

According to another aspect, a storage system may include a memory and a processor configured to perform operations. A write request may be received from a host and stored in a storage extent. At least one local I/O characteristic may be captured from the storage extent. At least one global I/O characteristic may be retrieved from a memory. The at least one local I/O characteristic and the at least one system I/O characteristic may be input to an aging model. The aging model may generate a forecasted write-pending aging time for the storage extent based on the at least one local I/O characteristic and the at least one system I/O characteristic.

The storage system may include, alone or in combination, one or more of the following features. The aging model may include a multivariate time-series model. The at least one local I/O characteristic may include at least one of an I/O size and a write-on-write frequency. The at least one global I/O characteristic may include at least one of a system write-pending level, a destage rate, a cache size, and an I/O per second rate.

According to another aspect, a non-transitory computer-readable medium storing one or more processor-executable instructions, which when executed by a processing circuitry, may cause the processing circuitry to perform the following operations. A write request may be received from a host. The write request may be stored in a storage extent. At least one local I/O characteristic may be captured from the storage extent and at least one system I/O characteristic may be retrieved from a memory. The at least one local I/O characteristic and the at least one system I/O characteristic may be input to an aging model. The aging model may generate a forecasted write-pending aging time for the storage extent based on the at least one local I/O characteristic and the at least one system I/O characteristic.

The non-transitory computer-readable medium may include, alone or in combination, one or more of the following features. The aging model may include a multivariate time-series model. The at least one local I/O characteristic may include at least one of an I/O size and a write-on-write frequency. The at least one global I/O characteristic may include at least one of a system write-pending level, a destage rate, a cache size, and an I/O per second rate.

BRIEF DESCRIPTION OF THE DRAWINGS

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Aspects of the present disclosure provide methods and apparatuses for improving storage array performance by using time-series characteristics on both a local storage area basis (extent-level, or track-level) as well as a global, system level. The time series characteristics are input to an aging model where optimal aging times, on a per-extent basis, are forecasted according to the local and global characteristics. The aging model may be a multivariate time-series model. Incoming write requests may be destaged from cache memory according to the forecasted optimal aging times for the storage extents.

Figure 1:
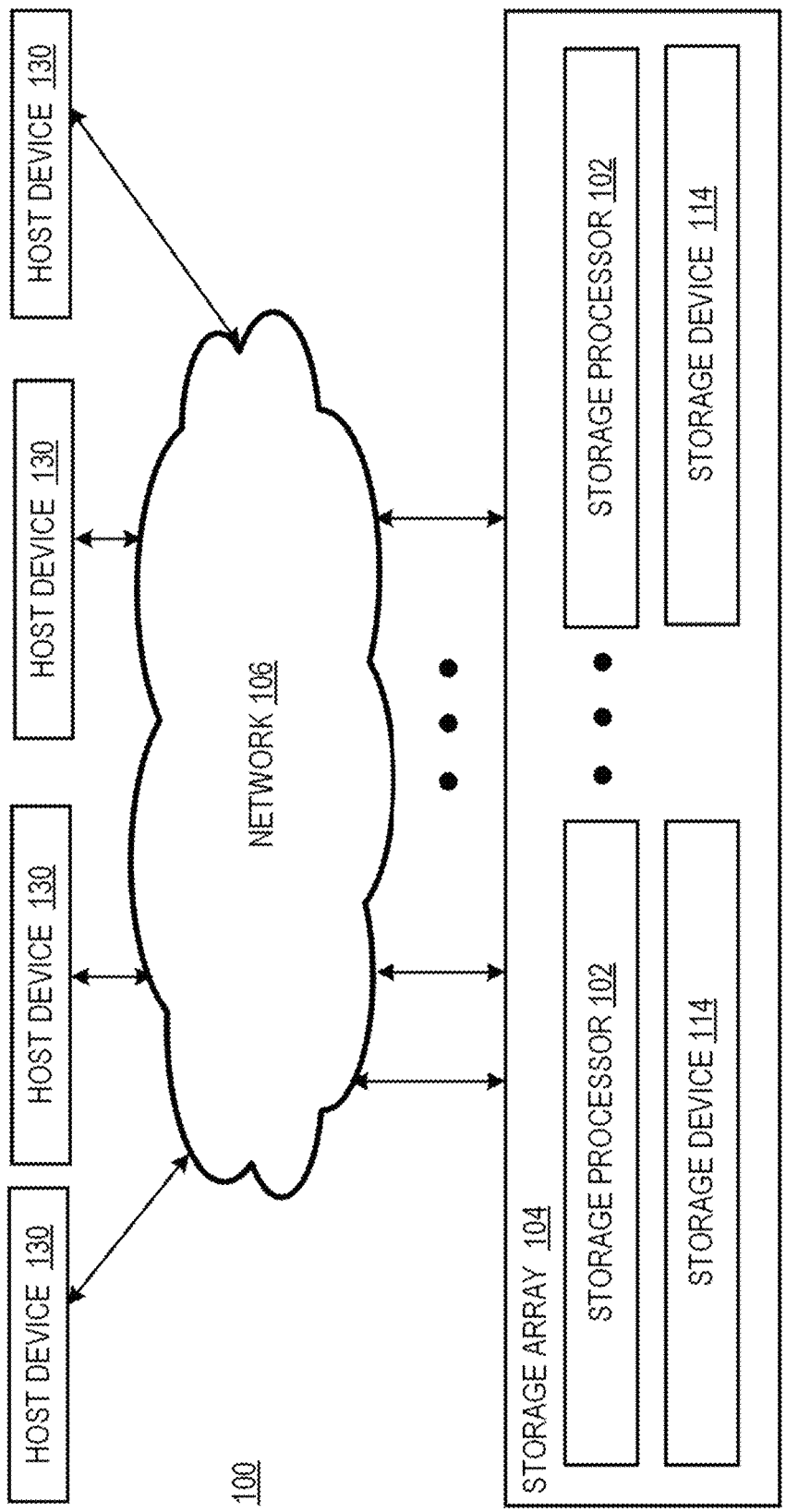
FIG. 1 is a diagram of an example of a storage system, according to one or more aspects of the present disclosure.

FIG. 1 is a diagram of an example of a storage system 100, according to aspects of the disclosure. As illustrated, the system 100 may include a storage array 104, a communications network 106, and a plurality of host devices 130. The communications network 106 may include one or more of a fibre channel (FC) network, the Internet, a local area network (LAN), a wide area network (WAN), and/or any other suitable type of network. The storage array 104 may include a storage system, such as DELL/EMC Powermax™, DELL PowerStore™, and/or any other suitable type of storage system. The storage array 104 may include or be arranged with one or more node-pairs and a plurality of non-volatile memory storage devices 114. The storage devices may be configured in a RAID-1 configuration with corresponding mirrored memories. Each node of the node pairs may include one or more storage processors 102. Each of the storage processors 102 may be configured to receive Input/Output (I/O) requests from host devices 130 and execute the received I/O requests by reading and/or writing data to storage devices 114. Each of the host devices 130 may include a desktop computer, a laptop, a smartphone, an internet-of-things (IoT) device, and/or any other suitable type of computing device.

According to one aspect, each of storage devices 114 may be a non-volatile memory express (NVMe) drive. In another aspect, the storage devices may be solid-state drives (SSD). In some implementations, each of the storage devices 114 may be connected to the storage processors 102 via a Peripheral Component Interconnect Express (PCIe) connection. Each of the storage devices 114 may include a respective controller (not shown) and storage medium (not shown). The controller of each storage device 114 may include processing circuitry that is configured to perform various tasks, such as the retrieval and storage of data on the medium, wear leveling, error handling, garbage collection, as well as other functions. The medium may include an array of NAND memory cells and/or any other suitable type of storage medium.

In some implementations, any of the storage devices 114 may be internal to one of the storage processors 102 and coupled to the storage processor via an M.2 slot that is provided on the motherboard of that storage processor. Additionally, or alternatively, in some implementations, any of the storage devices 114 may be part of a disk array enclosure (DAE) and coupled to each of the storage processors 102 via a respective InfiniBand adapter of that storage processor. It will be understood that the present disclosure is not limited to any specific method for connecting storage devices 114 to storage processors 102.

Figure 2:
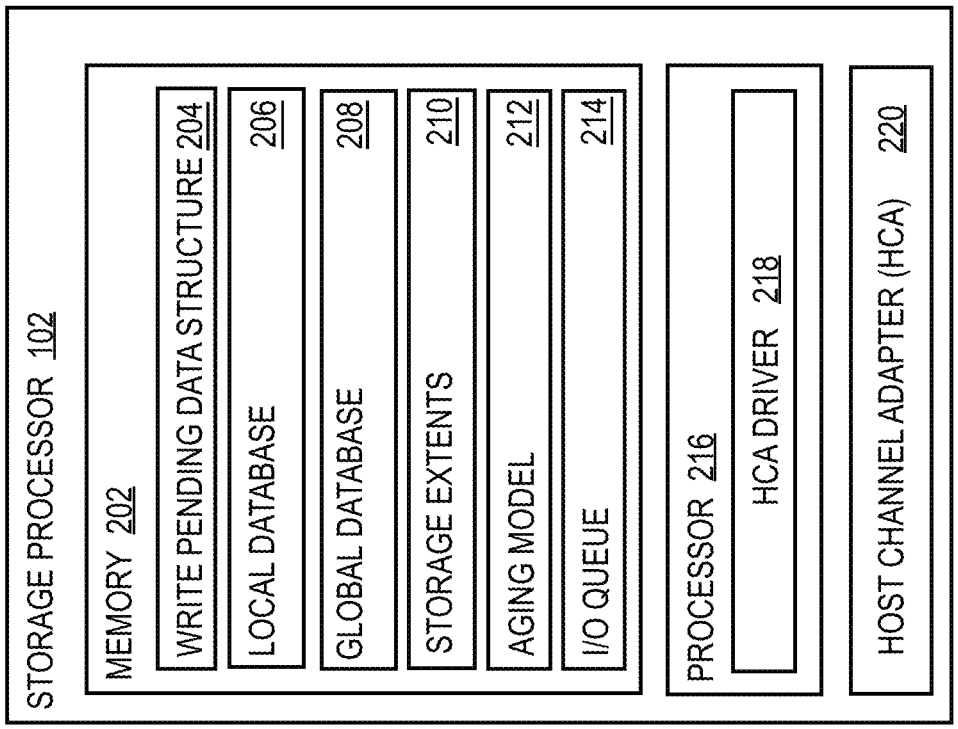
FIG. 2 is a diagram of an example of a storage processor, according to one or more aspects of the present disclosure.

FIG. 2 is a diagram of an example of a storage processor 102, according to aspects of the disclosure. As illustrated, the storage processor 102 may include a memory 202, a processor 216, and a host channel adapter (HCA) 220. According to the present example, the HCA 220 may be an NVIDIA ConnectX-6 TM HCA. The processor 216 may include any suitable type of processing circuitry, such as one or more of a general-purpose processor (e.g., an x86 processor, a MIPS processor, an ARM processor, etc.), a special-purpose processor, an application-specific integrated circuit (ASIC), a field programmable gate array (FPGA), etc. The memory 202 may include any suitable type of volatile and/or non-volatile memory, such as a solid-state drive (SSD), a hard disk (HD), a random-access memory (RAM), a Synchronous Dynamic Random-Access Memory (SDRAM), etc. The HCA 220 may be a circuit board or integrated circuit adapter that connects the storage processor 102 to the network 106 and the storage array 104 (shown in FIG. 1).

The memory 202 may include, be connected to, or otherwise access a write pending data structure 204, a local database 206, a global database, storage extents 210 an aging model 212, and an I/O queue 214. While each of the components are shown in FIG. 2 as a part of the memory 202, one skilled in the art will recognize that any of the components may be located outside of the memory 202 and in other components, circuitry or other structures accessible by the storage processor 102.

According to one aspect, as described herein, the storage processor 102 may be configured to process incoming I/O requests according to a forecasted write pending aging time, per storage extent or track. The forecasted write pending aging time may be based on time series characteristics, including statistics, variables and other date relating to the operation of the storage array 104 and the storage processor. The characteristics on which the forecast is based may include local characteristics and data, including I/O size and write-on-write frequency, obtained from local storage extents 210 and stored in the local database 206. In addition, the global database 208 may store and provide system-level characteristics to further inform the processing of incoming I/O requests. Global characteristics may include, without limitation, data including a system write pending level, a destage rate, a cache size, and/or an I/O per second (IOPS). Incoming I/O requests, including host writes, write-on-write requests, and the like, may be processed to an I/O queue 214 in cache with the forecasted write pending aging time, where the request will be stored until it is destaged (i.e., at the expiration of the forecasted write pending time).

As described herein, an aging model 212, such as a multivariate time-series model, may be built, trained and used to forecast write pending aging on a per extent basis. According to one or more aspects, the forecasted write pending age times may vary dynamically for different extents according to the aging model outputs. Applying the aging model to forecast optimal aging on a per extent basis provides a number of advantages both on an array-level and a local disk level. For example, forecasting optimal aging times leads to improved utilization of cache, CPU and memory, improved workload balance, and reductions in disk wear and tear and power consumption.

The processor 216 may execute an HCA driver 218 for the HCA 220. The driver may be configured to, at least in part, manage the I/O queue 214 as well as any other queues that are used by the storage processor 102 for the transmission of data via the HCA.

Figure 3:
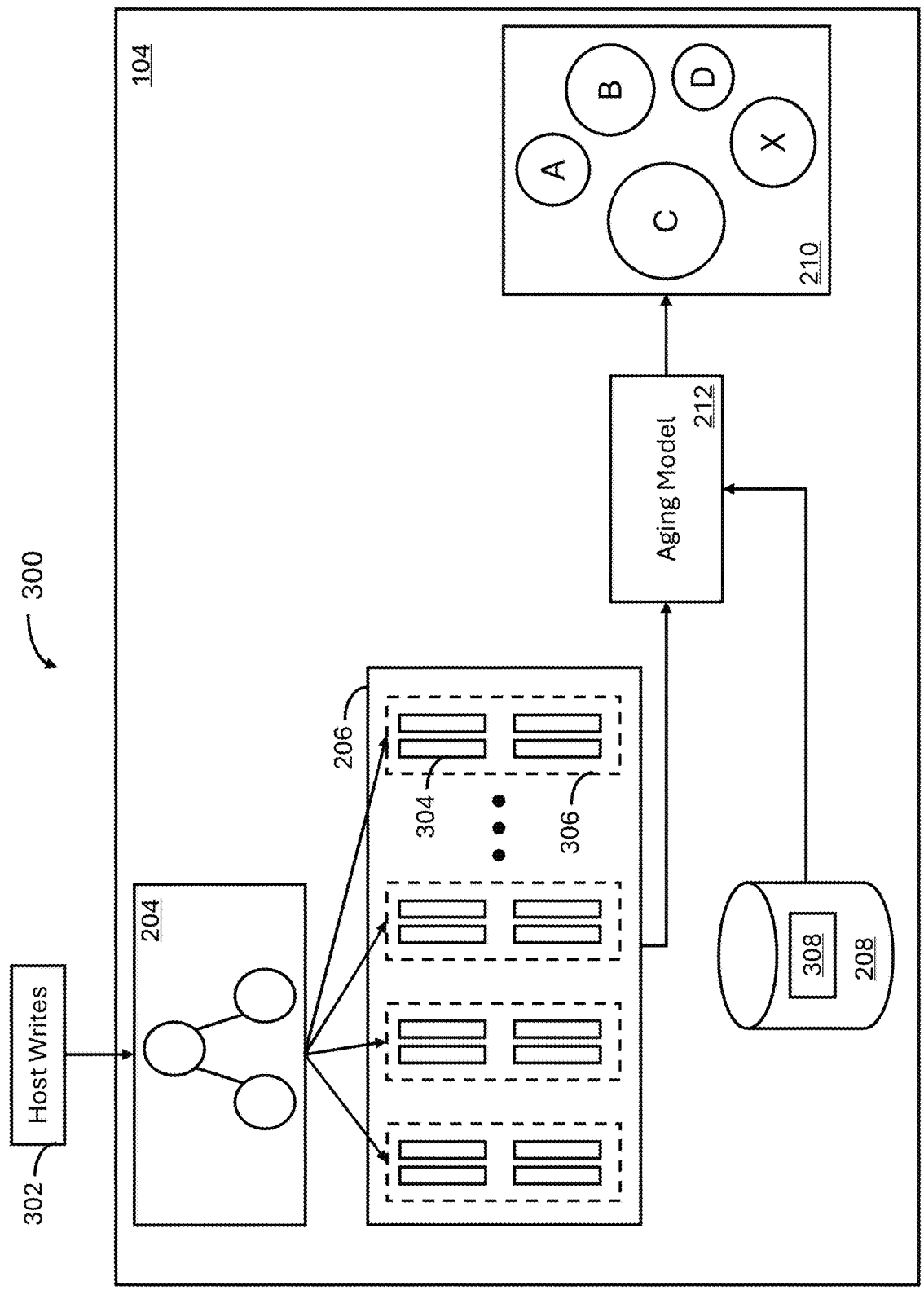
FIG. 3 is a diagram of an architecture of a storage array, according to one or more aspects of the present disclosure.

FIG. 3 is a diagram of an architecture 300 of a storage array 104 according to one or more aspects of the disclosure. The storage array 104 may receive one or more host writes 302 from a host, such as a host device 130 shown in FIG. 1. The host writes 302 may be added to an array data structure 204. According to one aspect, the array data structure may include a B-tree or other similar structure configured to facilitate searching an extent write pending.

According to one aspect, local I/O characteristics 304 may be captured from each incoming I/O operation 306, including from the host writes 302, and maintained in a local I/O database 206. The local characteristics 304 may include extent-level characteristics, including I/O size and write-on-write frequency (i.e., how often an extent is used in back-to-back writes in a short period of time), captured from each I/O operation 306. One skilled in the art will recognize that the identified characteristics are not exhaustive and other extent-level characteristics relating to the local I/O process flow may be captured, maintained, and used as described herein.

The global database 208 may include and maintain global I/O characteristics 308, including statistics, variables and other data captured and maintained on a system-level. According to one aspect, global characteristics may include data regarding or relating to a write pending level (i.e., the number of pending write operations), IOPS, a system cache size, and a destage rate, for example. One skilled in the art will recognize that the identified characteristics are not exhaustive and other system-level characteristics relating to the I/O process flow may be captured, maintained, and used as described herein.

The local characteristics 304 and global characteristics 308 may be input to an aging model 212 to generate a forecasted optimal write pending age for each extent to which incoming host writes 302 are cached. According to one aspect of the disclosure, the aging model 212 may be or include a multivariate time-series model built on the local characteristics 304 and global characteristics 308. The aging model 212 may be configured to forecast write pending times (i.e., ages) for the storage extents 210 within the constraints of the cache size and ongoing wear and tear of the disk. According to one aspect, the forecasts output from the aging model 212 may include varying aging times for each of the storage extents in the cache memory. As shown in FIG. 3, storage extents 210 may include a number of extents (A-D, X), each having its own write pending aging time, represented by the varying sizes of the individual extents (A-D, X). For example, extent C may have a forecasted write pending aging time longer that extents A, B, D, and X. Extent A, on the other hand, may have a smaller aging time than the other extents based on the forecasted optimal aging time from the aging model 212.

Figure 4:
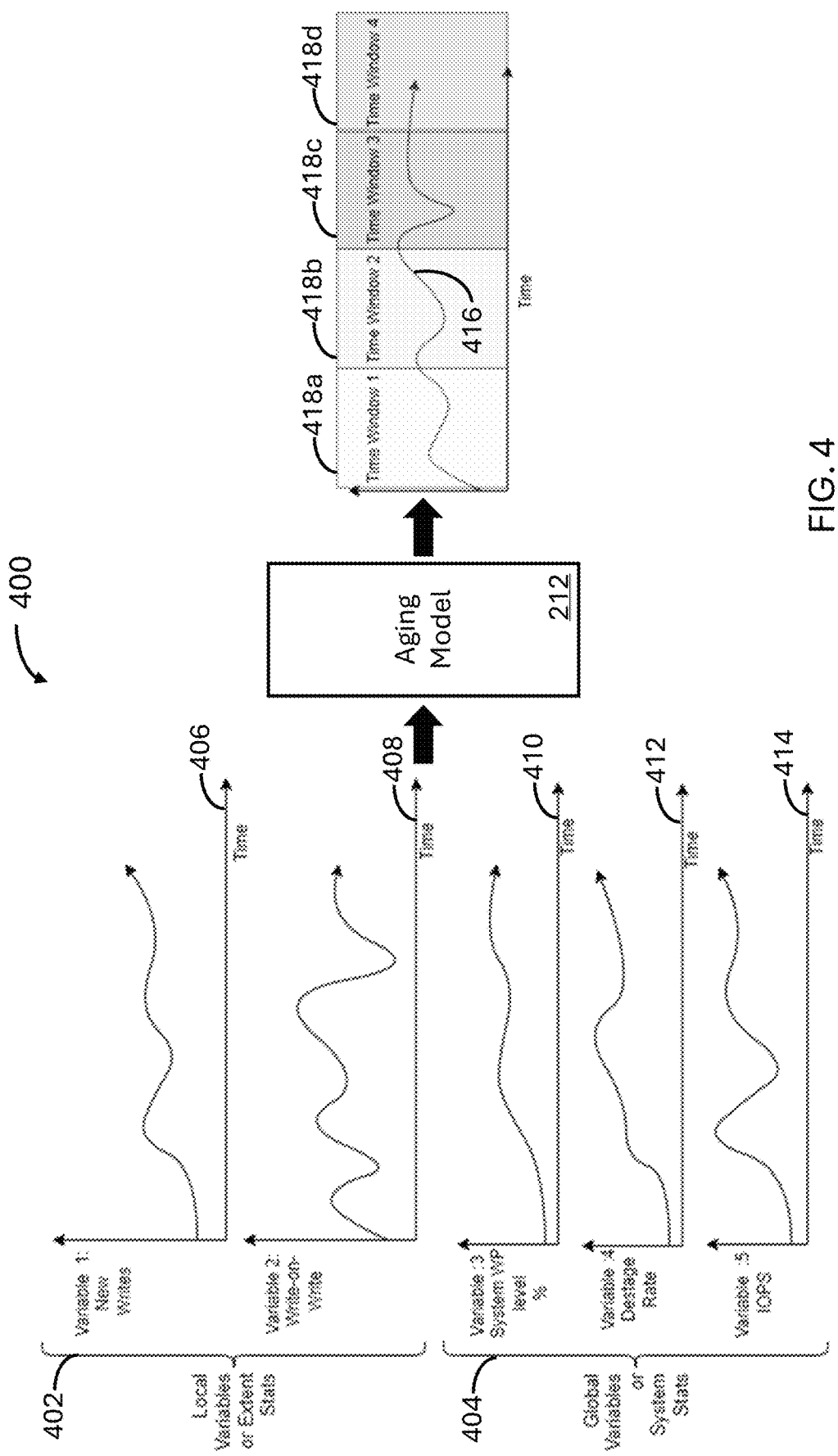
FIG. 4 is a flow diagram of an example of an aging model, according to one or more aspects of the present disclosure.

FIG. 4 is a flow diagram 400 of an example of the aging model 212 according to one or more aspects of the disclosure. As described above, the aging model 212 may be configured to receive local characteristics 402 based on extent-level statistics, variables and other data. For example, a first local variable 406 may include a number of new write operations per extent over time. A second local variable 408 may include a number of write-on-write operations per extent over time.

Additionally, the aging model 212 may be further configured to receive global characteristics 404 including system level statistics, variables and other data. For example, a first global variable 410 may include a system write pending level (i.e., a percentage of system memory utilization) over time. A second global variable 412 may include a system destage rate over time and a third global variable 414 may include a system IOPS rate over time.

The local characteristics 402 and the global characteristics 404 may be input to and received by the aging model 212. According to one aspect, the aging model may be or include a multivariate times-series model configured to output a forecasted optimal aging time for each of the extents in the cache memory. According to one aspect, the aging model output may be given or considered as an extent aging time 416 over a series of time windows 418a-d. According to one aspect, each extent may have a similar plot of aging time over the time windows 418a-d. From these outputs, write pending aging times may be managed and processed according to the forecasted optimal aging time for each extent.

Figure 5:
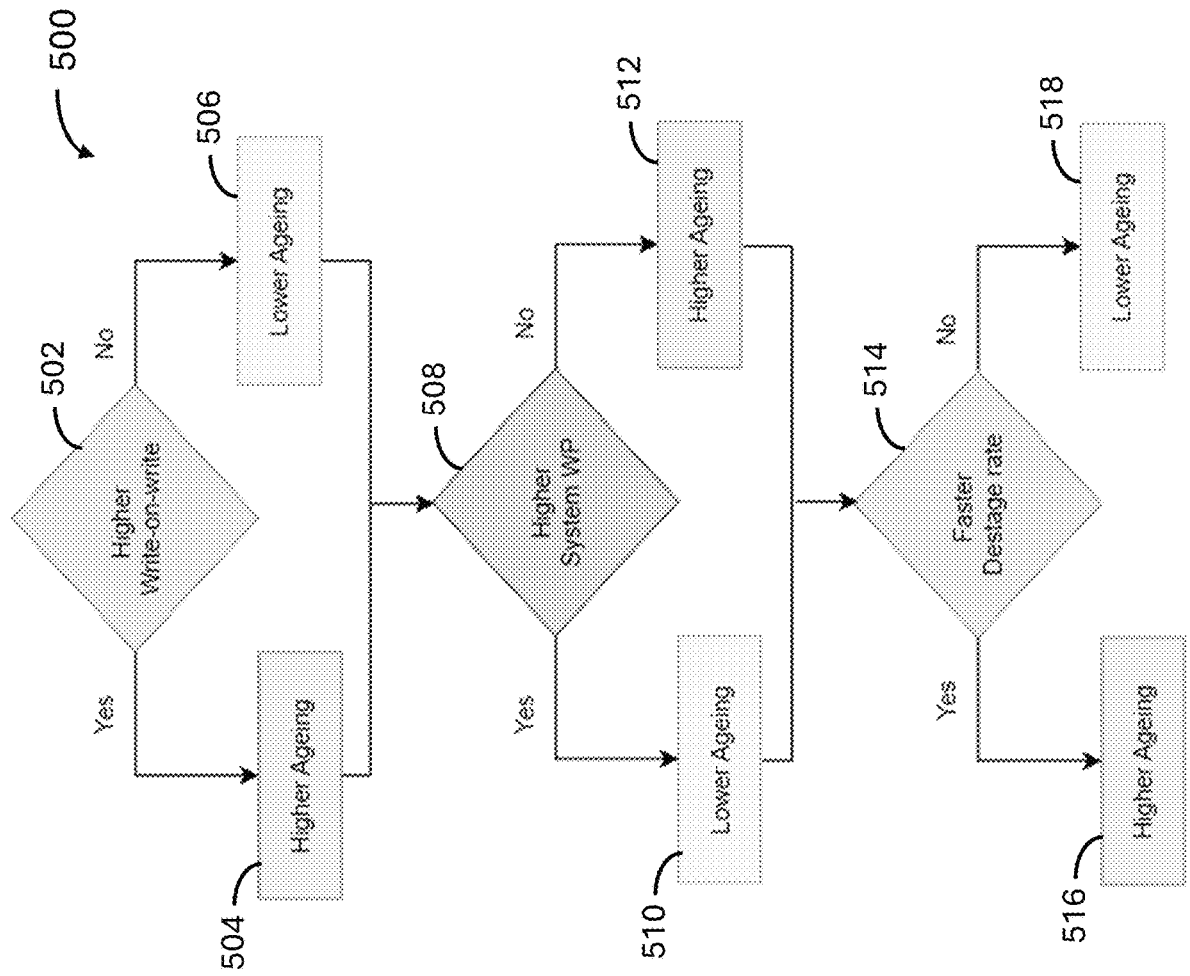
FIG. 5 is a flow diagram of write pending aging trends, according to one or more aspects of the present disclosure.

FIG. 5 is a flow diagram of write pending aging trends 500 according to one aspect of the present disclosure. The input characteristics (local and global) may be analyzed by the multivariate time-series aging model according to one or more trends, including, for example, a higher write-on-write time, a higher system write pending level, and/or a faster destage rate. Accordingly, as shown in block 502, if the write-on-write statistics are above a certain threshold the model may forecast a higher aging time, shown in block 504, to accommodate the higher number of repeated writes. Alternatively, if the write-on-write statistics are below a threshold, the aging time for the extent may be lowered, shown in block 506, and the incoming writes may be destaged sooner.

Similarly, as shown in block 508, if the system write pending level is above a certain level, the aging time of one or more extents may be lowered, shown in block 510, to process in the incoming writes sooner and decrease the number of pending operations in write pending stack. If the system write pending level is below the threshold, aging time may be increased, shown in block 512, allowing some operations to remain in cache longer to relieve resource strain on the system.

As shown in block 514, if the destage rate is above a given threshold, then the aging time may be increased, shown in block 516, again thereby relieving resource strain. If the destage rate is below a threshold, the aging time, as shown in block 518, may be lowered to process the pending writes sooner to take advantage of resources that are not under strain or fully utilized.

While the flow diagram of FIG. 5 may show the three aging trends in a sequence, one skilled in the art will recognize that, because the aging model is a multivariate time-series model, the characteristics and trends may be processed by the model concurrently and that the decisions of one trend do not necessarily or directly affect the other trends considered by the model. One will also recognize that other trends relating to the local and global characteristics may be considered by the model and the scope of the present disclosure is not limited to the exemplary trends (e.g. write-on-write rate, system write pending level, destage rate) shown in FIG. 5.

Figure 6:
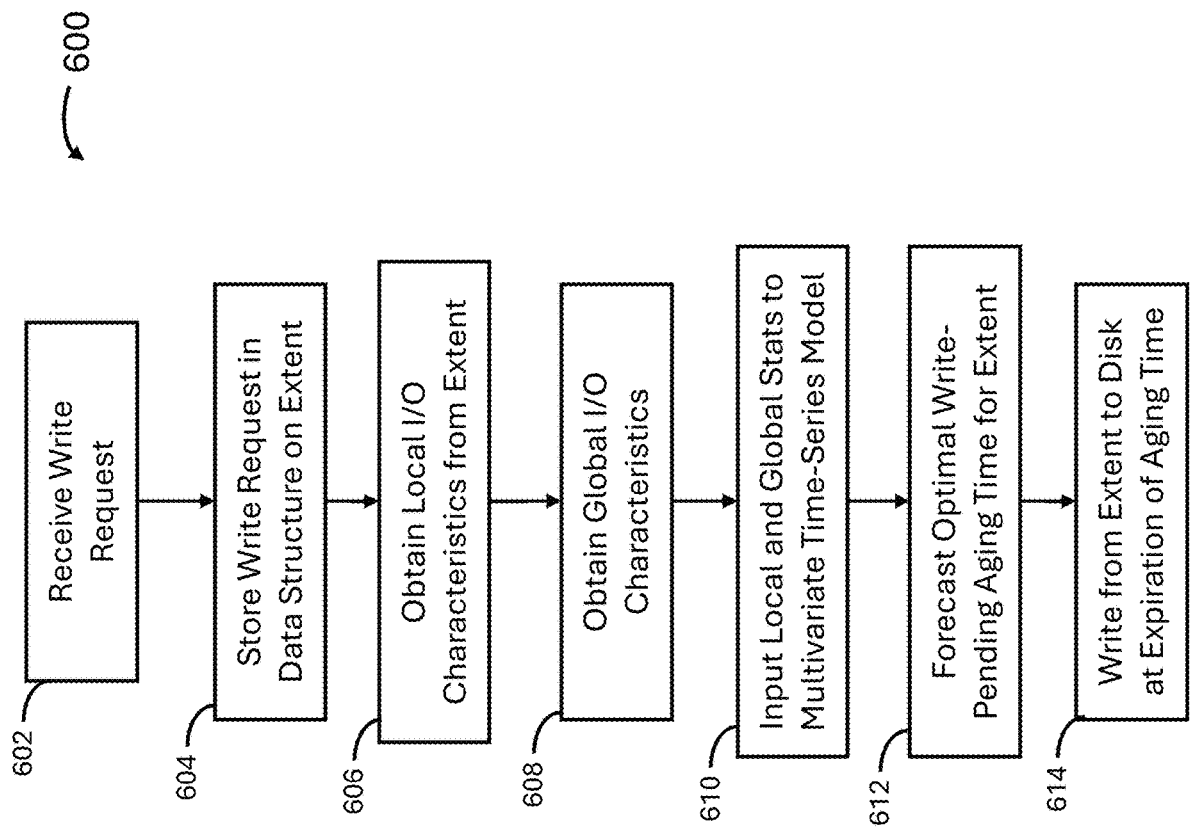
FIG. 6 is a flow diagram of an example method of processing an Input/Output (I/O) write request, according to one or more aspects of the present disclosure.

FIG. 6 is a flow diagram of an example method 600 of processing an I/O write request, according to aspects of the disclosure. As shown in block 602, a write request may be received from a host over a network, as described herein. According to one aspect, the incoming I/O write request may be either a compressed host write or an uncompressed host write. The write request, as shown in block 604, may be parsed and stored according to a data structure on a storage extent. According to one aspect, the data structure may include a B-tree structure or the like. As shown in block 606, local I/O characteristics may be obtained on an extent-level basis. Global I/O characteristics, on a system level, may also be obtained, shown in block 608. The local and global I/O characteristics may be input into an aging model, including a multivariate time-series model, shown in block 610. The aging model, shown in block 612, may output or forecast an optimal write pending aging time per extent based on the local and global characteristics considered by the aging model. As described herein, the aging times forecast by the model may vary depending on the extent. According to one aspect, shown in block 614, the write requests may be stored on the given extent according to the optimal aging time and, after the expiration of the optimal aging time, be destaged to long-term, non-volatile memory.

As described herein the methods and apparatuses for statistical-based I/O processing reduce the wear and tear on disks caused by repeated, write-on-write operations, thereby extending the life of a solid state drive. Further, the ability to dynamically adjust how and when I/O requests, including write requests, are cached and destaged may avoid costly processing resources in the CPU, disk and memory caused by repeated compression of the stage storage areas. Storage array performance may also be improved using forecasted optimal aging times. For example, CPU and memory utilization may increase with lower strain on disk destaging resources. I/O response times and IOPS may also benefit from the efficient caching of the requests for optimal write pending times.

Figure 7:
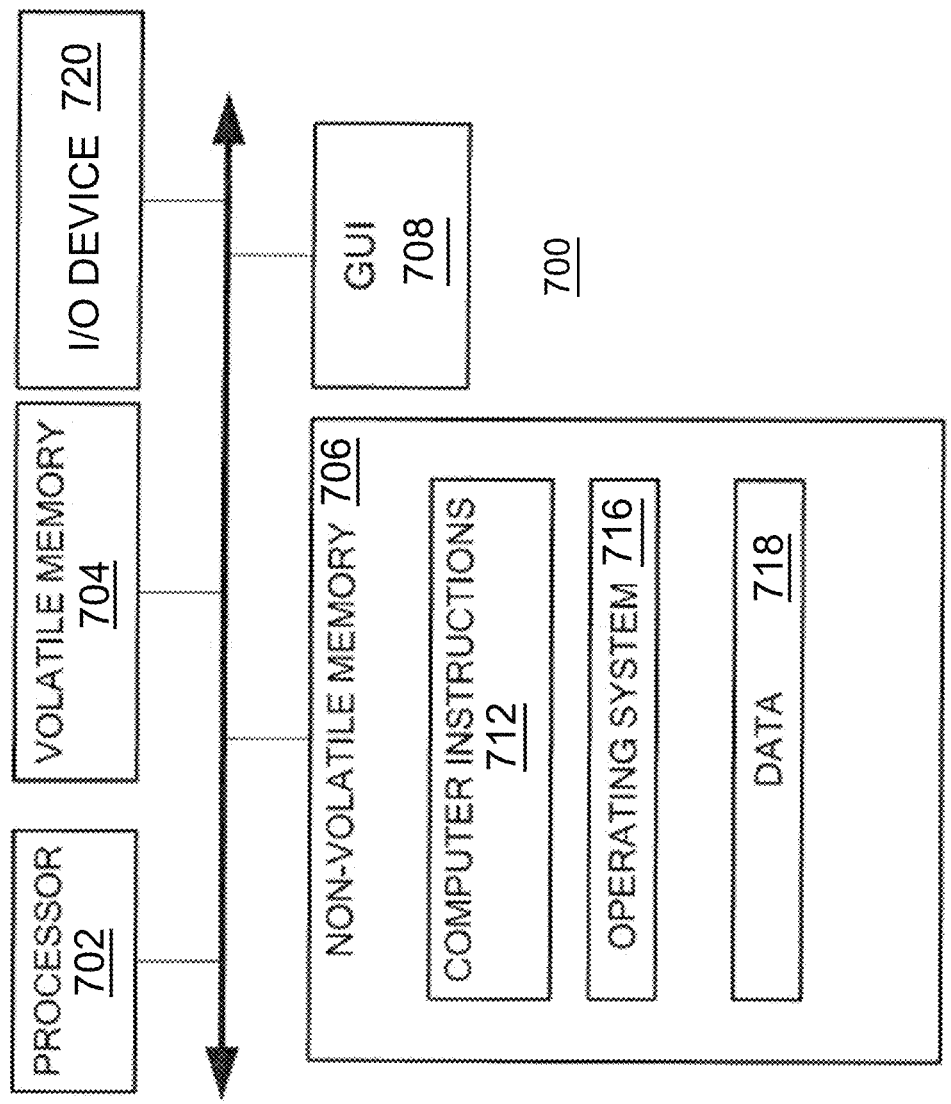
FIG. 7 is a diagram of an example of a computing device, according to one or more aspects of the present disclosure.

Referring to FIG. 7, in some embodiments, a computing device 700 may include processor 702, volatile memory 704 (e.g., RAM), non-volatile memory 706 (e.g., a hard disk drive, a solid-state drive such as a flash drive, a hybrid magnetic and solid-state drive, etc.), graphical user interface (GUI) 708 (e.g., a touchscreen, a display, and so forth) and input/output (I/O) device 720 (e.g., a mouse, a keyboard, etc.). Non-volatile memory 706 stores computer instructions 712, an operating system 716 and data 718 such that, for example, the computer instructions 712 are executed by the processor 702 out of volatile memory 704. Program code may be applied to data entered using an input device of GUI 708 or received from I/O device 720.

FIGS. 1-7 are provided as an example only. In some aspects or embodiments, the term "I/O request" or simply "I/O" may be used to refer to an input or output request. In some embodiments, an I/O request may refer to a data read or write request. At least some of the steps discussed with respect to FIGS. 1-6 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

What is claimed is:

1. A method for storing data, the method comprising:
training a multivariate time-series aging model with a plurality of training samples generated from local Input/Output (I/O) statistics and global I/O characteristics stored in one or more databases;
receiving a write request from a host;
storing the write request in a storage extent;
capturing at least one local I/O characteristic from the storage extent;
retrieving at least one global I/O characteristic from a memory;
inputting the at least one local I/O characteristic and the at least one global I/O characteristic to the multivariate time-series aging model; and
generating by the multivariate time-series aging model a forecasted write-pending aging time for the storage extent based on the at least one local I/O characteristic and the at least one global I/O characteristic.

2. The method of claim 1 further comprising writing the write request from the storage extent to a nonvolatile memory storage at an expiration of the forecasted write-pending aging time.

3. The method of claim 1 wherein the at least one local I/O characteristic comprises an I/O size.

4. The method of claim 1 wherein the at least one local I/O characteristic comprises a write-on-write statistic.

5. The method of claim 1 wherein the at least one global I/O characteristic comprises a system write-pending level.

6. The method of claim 1 wherein the at least one global I/O characteristic comprises a destage rate.

7. The method of claim 1 wherein the at least one global I/O characteristic comprises a cache size.

8. The method of claim 1 wherein the at least one global I/O characteristic comprises an I/O per second rate.

9. The method of claim 1 wherein the write request comprises a compressed write request.

10. The method of claim 1 wherein the write request comprises an uncompressed write request.

11. The method of claim 1 wherein the forecasted write-pending aging time comprises a window and the write request is written from the storage extent to a nonvolatile memory storage during the window.

12. The method of claim 1 wherein the write request is stored in a write-pending data structure.

13. The method of claim 12 wherein the write-pending data structure includes a B-tree.

14. A storage system comprising:
a memory; and
a processor configured to perform the operations of:
training a multivariate time-series aging model with a plurality of training samples generated from local Input/Output (I/O) statistics and global I/O characteristics stored in one or more databases;
receiving a write request from a host;
storing the write request in a storage extent;
capturing at least one local I/O characteristic from the storage extent;
retrieving at least one global I/O characteristic from a memory;
inputting the at least one local I/O characteristic and the at least one global I/O characteristic to the multivariate time-series aging model; and
generating by the multivariate time-series aging model a forecasted write-pending aging time for the storage extent based on the at least one local I/O characteristic and the at least one global I/O characteristic.

15. The storage system of claim 14 wherein:
the at least one local I/O characteristic comprises at least one of an I/O size and a write-on-write frequency; and
the at least one global I/O characteristic comprises at least one of a system write-pending level, a destage rate, a cache size, and an I/O per second rate.

16. A non-transitory computer-readable medium storing one or more processor-executable instructions, which when executed by a processing circuitry, further cause the processing circuitry to perform the operations of:
training a multivariate time-series aging model with a plurality of training samples generated from local Input/Output (I/O) statistics and global I/O characteristics stored in one or more databases:
receiving a write request from a host;
storing the write request in a storage extent;
capturing at least one local I/O characteristic from the storage extent;
retrieving at least one global I/O characteristic from a memory;
inputting the at least one local I/O characteristic and the at least one global I/O characteristic to the multivariate time-series aging model; and
generating by the multivariate time-series aging model a forecasted write-pending aging time for the storage extent based on the at least one local I/O characteristic and the at least one global I/O characteristic.

17. The non-transitory computer-readable medium of claim 16 wherein: the at least one local I/O characteristic comprises at least one of an I/O size and a write-on-write frequency; and the at least one global I/O characteristic comprises at least one of a system write-pending level, a destage rate, a cache size, and an I/O per second rate.

* * * * *